Nov. 14, 1939.  A. W. L. HARTBAUER  2,179,503
BRAKE OPERATING MECHANISM
Filed Jan. 25, 1937
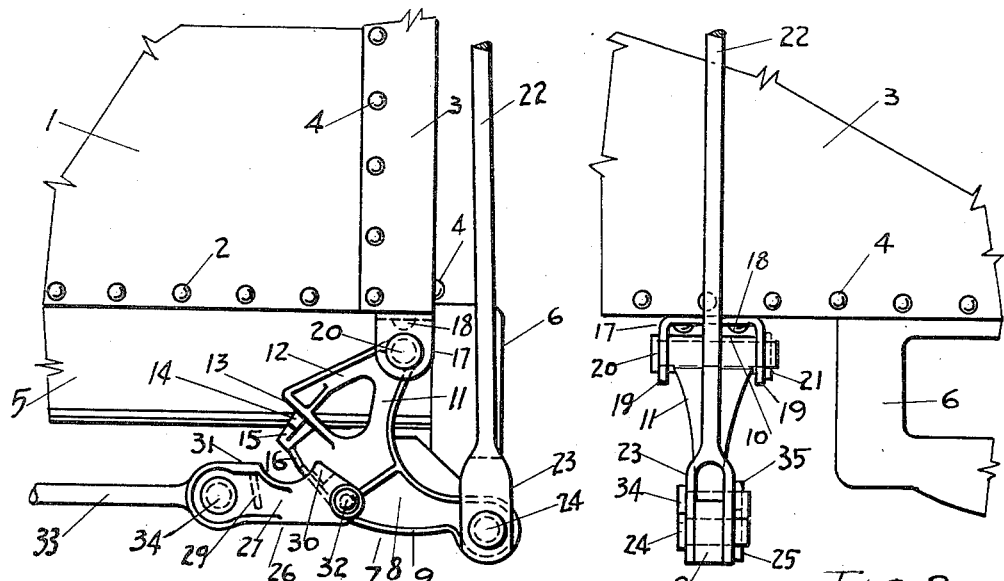
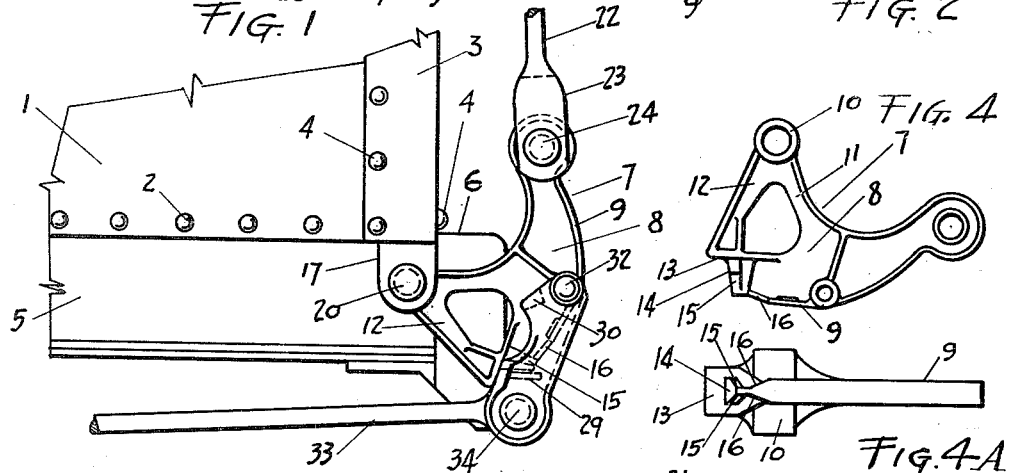
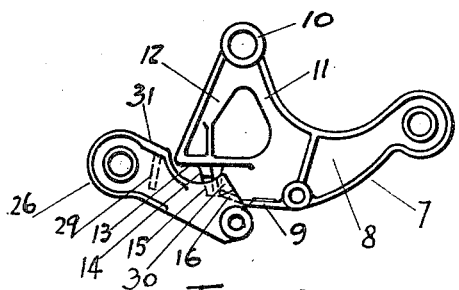
INVENTOR.
BY August W. L. Hartbauer
ATTORNEY.

Patented Nov. 14, 1939

2,179,503

UNITED STATES PATENT OFFICE 2,179,503

BRAKE OPERATING MECHANISM

August William Louis Hartbauer, Chicago, Ill.

Application January 25, 1937, Serial No. 122,178

7 Claims. (Cl. 74—516)

The invention relates to brake operating mechanism and particularly to brake operating mechanism for use on railway cars.

The brake operating mechanism of the invention employs a direct connected bell crank operating in connection with a hand brake pull rod which is substantially vertical and is a rigid member. The bell crank is also connected with an extension member or connecting link which in turn is connected with a body brake rod which is under the car body. This latter rod which is also rigid is in a substantially horizontal position. The connecting link is used instead of a chain.

The bell crank commonly used on railway cars employs a chain as a means of connection for the horizontal or body brake rod to the bell crank. An ordinary chain does not meet the requirements of the railroad companies for strength and therefore the railroad companies are required to have in stock and to have available at repair points or locations a special proof coil chain. This is a detail which is watched closely by the railroad company's inspectors to be certain that correct repairs are made in cases of necessity. Another condition which results from the use of chains in the brake mechanism is that slack cannot be entirely eliminated. It is therefore necessary that the hand brake unit or mechanism must compensate for this lost motion to insure proper application of the brakes.

One of the objects of the invention is to provide a means of positive and direct connection for the body hand brake rod to the bell crank, or in other words to provide a rigid unit bottom rod and bell crank connection as a means of transmitting the power initially applied to the vertical brake rod, then to the horizontal brake rod without interruption, thus synchronizing the movement of these rods in either power or release positions.

A further object of the invention is to fix and maintain the relative positions of the body hand brake rod connecting link which is employed in the brake operating mechanism and the bell crank by having surfaces of the connecting link contact the short, rear end contact surface of the bell crank, and by having the connecting link and the rearward reduced flanges or guide portion extending from the short contact surface of the bell crank in engagement.

An additional object of the invention is to limit the swinging of the connecting link with respect to the bell crank, or in other words to limit the gravity actuated release movement of the connecting link with respect to the bell crank, thereby supporting the end of the brake rod connected to the link, eliminating thereby, oscillation or side roll of the rod and maintaining the ultimate release position of said rod unaffected by the reactions of train motion.

Further objects and advantages of the invention will be more readily apparent and more fully described in connection with the following description taken with the accompanying drawing showing the preferred embodiment of the invention, but it will be understood that changes may be made in the parts and details of construction without departing from the principles of the invention and I therefore do not limit myself to the exact construction shown and illustrated, but in the claims hereinafter set forth I intend to cover all modifications and variations of the invention.

In the drawing:

Figure 1 is a side elevational view of the invention showing the bell crank, the connecting link and the rigid rods all in full released position.

Figure 2 is an end elevation of the invention showing the bell crank and the other brake parts in full released position.

Figure 3 is a side elevational view showing the bell crank and the connecting link in engagement and also shows the rigid rods and all the parts moved from the released position shown in Figures 1 and 2 to operative position.

Figure 4 illustrates a side elevational view of the bell crank showing particularly the flanges used in engaging the bell crank and the connecting link.

Figure 4A illustrates the bottom plan view of the bell crank showing particularly the engaging flanges of the bell crank.

Figure 5 is a top plan view of the connecting link.

Figure 5A is a side elevational view of the connecting link.

Figure 6 illustrates the bell crank and the connecting link as they are about to be assembled to be put in operative position and shows the stop lugs of the connecting link registering with the reduced flanges of the bell crank as the connecting link is being moved toward operative and assembly position with the bell crank.

As illustrative of the invention there is shown a portion of a railway car in which the steel side sheathing plates 1 are secured to the car body by rivets 2. The steel end sheathing plate 3 is secured to the car body and the plates 1 by rivets 4. The center sills 5 of the car body are extended to form a support for the dead block 6. The bell crank generally designated 7 has a web section 8 which is reinforced by the outer or peripheral flanges 9, 9 which extend along the outer edges of the bell crank on both sides of the web section 8. The web section 8 is connected to the supporting bearing 10 by a reinforced front or forward strut 11 and a reinforced rear or trailing strut 12. The rear or trailing strut 12 is provided with supporting flanges 13, 13 which extend inwardly and toward the front or forward strut 11 and the web section 8. The under face of the flanges 13, 13 provide a relatively short and restricted contact surface at the rear end of the bell crank to enable the connecting link 26 to make contact as hereinafter described.

The portion of the web section 8 of the bell crank generally designated 7 which projects from the supporting flanges 13, 13 is reinforced by the rearward reduced end flanges 14, 14 and the outer flanges 9, 9. The reduced end flanges 14, 14 extend on both sides of the web section 8 as do the outer flanges 9, 9. The reduced end flanges 14, 14 constitute a guide portion which extends outwardly from the relatively short and restricted contact surface at the rear end of the bell crank. They are tapered at 15 and the flanges 9, 9 are tapered at 16 on both sides of the web section to form a section approximately the thickness of the bell crank web section 8 to facilitate assembly of the bell crank generally designated 7 and the connecting link generally designated 26.

The bell crank supporting bracket 17 is attached to the car body with rivets 18. The bell crank 7 is movably attached to the supporting bracket 17 with the bearing 10 positioned between the flanges 19, 19 of the supporting bracket 17. The supporting bracket flanges 19, 19 are provided with apertures to receive the bell crank pin 20 which pin is secured in the bracket by the cotter 21.

The rigid substantially vertical end brake rod 22 is provided with a bifurcated jaw connection 23 for attachment to the bell crank 7. Each of the jaws of the connection 23 are apertured to receive the assembly pin 24 and the assembly pin 23 is secured by the cotter 25.

The connecting link generally designated 26 is channel shaped with flanges 27, 27 spaced apart by web members 28, 28 and the cross strut 29. The cross strut 29 connects the flanges 27. The inner surfaces of the flanges 27, 27 are provided with stop lugs 30, 30. These stop lugs 30, 30 are each adapted to contact its respective flange 9 on the respective sides of the web section 8 of the bell crank 7 as the bell crank moves toward the released position as shown in Figures 1 and 2.

The flanges 27, 27 of the connecting link 26 have bearing surfaces 31, 31 which are adapted to contact the short, restricted under surface of the flange 13 of the bell crank 7. One end of the connecting link 26 is swingingly attached to the bell crank 7 with the pivot pin 32. The other end of the connecting link 26 is pivotally connected to the rigid substantially horizontal body brake rod 33 with pivot pin 34 which is secured in place with the cotter 35.

When the bell crank 7 is moved from the released position to the operative position as shown in Figure 3 of the drawing, the bell crank 7 swings on the bell crank pivot pin 20 and carries with it the connecting link 26 which in its turn swings on the pivot pin 32. The body brake rod 33 pivotally connected by the pin 34 is also moved into operative position. When the connecting link 26 is swung forwardly, the flanges 31, 31 contact with the relatively short and restricted contact surface of the flanges 13, 13 at the rear end of the bell crank, and the inner surfaces of the flanges 27, 27 of the connecting link enter into engagement with the rearward reduced end flanges 14, 14 or guiding portion extending from the short contact surface at the rear end of the bell crank 7 as shown in Figure 3. When in this operative position the stop lugs 30, 30 of the connecting link 26 are at their furthest removed position from the flanges 9, 9 of the bell crank adjacent the pivot pin 32 as shown in Figure 3 of the drawing. When the connecting link 26 is in a position opposite to that shown in Figure 3 the stop lugs 30, 30 contact with the bell crank flanges 9, 9 as shown in Figure 1 of the drawing.

It will be understood that the bell crank and the connecting link of the invention must be strong and sturdy and therefore care is used in the construction of the bell crank and the connecting link to withstand the great stresses and strains to which such appliances are put. In this connection the web sections, struts, cross pieces, flanges, bearings and other portions of the structure are formed accordingly. In order to lessen lateral movement and assist in keeping the bell crank 7 and connecting link 26 in proper alignment with each other, the stops 30, 30 and the reduced end flanges or guide portion 14, 14 are properly dimensioned with respect to the web section 8, the cross strut 29 and the connecting link flanges 27, 27.

It will be noted with reference to the bell crank 7, that the flanges 13, 13 and the intervening portion of the bell crank are set back from the rear edge of the flanges of the rear or trailing strut 12. It will also be noted that the reduced end flanges 14, 14 with the intervening portion which is at the rear end of the web section 8, are also set back from the rear edge of the trailing strut 12, and in addition are set back from the outer edges of the flanges 13, 13.

Having thus described the invention what I claim and desire to secure by Letters Patent is:

1. In brake operating mechanism, a bell crank, said bell crank being movably mounted on a body, said bell crank being connected to a hand brake rod, said bell crank having a web section, a forward strut and a rear or trailing strut, said web section and forward and rear struts having peripheral reinforcing flanges, the trailing strut having forwardly extending flanges set back from its peripheral flange, the reenforcing flanges of the web section of the bell crank at the trailing strut being reduced, a channel formed brake rod extension, a body brake rod, one end of said channel formed extension being pivoted to the bell crank and the other end thereof being connected to one end of the body brake rod, said channel formed extension having opposed stop lugs, said stop lugs being adapted to contact the inner surfaces of the peripheral web flanges of the bell crank in release position, said web section of the bell crank engaging with said extension when moved toward operative position.

2. In brake operating mechanism, a bell crank, said bell crank being movably mounted on a body, said bell crank being connected to a brake rod, said bell crank having a web section, a forward strut and a rear or trailing strut, said web section connecting said struts, said web section and said trailing strut being provided with reinforcing flanges, said trailing strut having peripheral flanges set back from its peripheral flange, the reenforcing flanges of the web section of the bell crank at the trailing strut being reduced, a brake rod extension, a brake rod, one end of the extension being hinged to the rod and the other end hinged to the bell crank, stop lugs on said extension, said stop lugs being adapted to contact said bell crank, said extension being adapted for engaging with the bell crank when moved toward operative position.

3. In brake operating mechanism, a bell crank, said bell crank being movably mounted on a body, said bell crank being connected to a brake rod, said bell crank having a web section, a forward strut and a rear or trailing strut, said web section connecting said struts, said web section and said trailing strut being provided with reinforcing flanges, said trailing strut having peripheral flanges set back from its first mentioned peripheral flange, said web section reinforcing flange also being set back from the rear edge of the trailing strut, a brake rod extension, a brake rod, one end of the extension being hinged to the rod and the other end hinged to the bell crank, said extension being adapted to engage with the bell crank web section, the said extension contacting the flanges of the trailing strut of the bell crank when moved toward operative position.

4. In brake operating mechanism, a bell crank, said bell crank being movably mounted on a body, said bell crank being connected to a brake rod, said bell crank having a web section, a forward strut and a rear or trailing strut, said web section connecting said struts, said web section and said trailing strut being provided with reinforcing flanges, said trailing strut having peripheral flanges set back from its first mentioned peripheral flange, said web section reinforcing flange also being set back from the rear edge of the trailing strut, a brake rod extension, a brake rod, one end of the extension being hinged to the rod and the other end hinged to the bell crank, limiting stop lugs on said extension, said limiting stop lugs being adapted to contact said bell crank, said extension being adapted to engage with the bell crank web section, the said extension contacting the setback flanges of the trailing strut of the bell crank when moved toward operative position.

5. In brake mechanism, a bell crank, said bell crank having a relatively short and restricted contact surface at its rear end, a guide portion extending from said short surface, an extension, said extension being pivotally connected to said bell crank, said bell crank provided with a bearing whereby the bell crank may be movably connected with a body, said bell crank having a web section, said extension having a limiting stop, said limiting stop coacting with said web section to limit the movement of said extension, said extension engaging with said bell crank by engaging said short contact surface and said guide portion.

6. In brake mechanism, a bell crank, an extension pivotally connected to said bell crank, said bell crank being provided with a bearing whereby the bell crank may be movably connected with a body, said bell crank having a peripheral flange, said extension having a limiting stop, said limiting stop coacting with said bell crank flange to limit the movement of said extension, said extension being channel shaped, said bell crank being provided with a web section, a front or forward strut and a rear or trailing strut, the peripheral flange reinforcing said web section, said forward strut and said trailing strut, said trailing strut reinforcing flange being extended forwardly of the rear edge of said trailing strut, the reinforcing flange of said web section at the rear portion thereof extending to said inwardly extending flange, the reinforcing flange of said web section being of a lesser dimension than the reinforcing inwardly extending flange, said channeled extension engaging with said web section and extending over the reinforcement of the web section and permitting contact of said channeled extension with the inwardly extending flange of the trailing strut.

7. In brake mechanism, a bell crank, an extension pivotally connected to said bell crank, said bell crank being provided with a bearing whereby the bell crank may be movably connected with a body, said bell crank having a peripheral flange, said extension having a pair of limiting stops, said limiting stops coacting with said bell crank flange to limit the movement of said extension, said bell crank being provided with a web section, a front or forward strut and a rear or trailing strut, the peripheral flange reinforcing said web section, said forward strut and said trailing strut, said trailing strut reinforcing flange being extended forwardly of the rear edge of said trailing strut, the reinforcing flange of said web section at the rear portion thereof extending to said inwardly extending flange, the reinforcing flange of said web section being of a lesser dimension than the reinforcing inwardly extending flange, said extension engaging with said web section and extending over the reinforcement of the web section and permitting contact of said extension with the inwardly extending flange of the trailing strut, said web section reinforcement being reduced to permit the passage through said web reinforcement of the limiting stops of said extension prior to said extension being pivotally connected to said bell crank.

AUGUST W. L. HARTBAUER.